United States Patent Office 2,923,717
Patented Feb. 2, 1960

2,923,717
HALOCYCLOALKENIC DERIVATIVES OF 1,2-METHYLENEDIOXYBENZENES

Herman S. Bloch, Skokie, and Louis Schmerling, Riverside, Ill., assignors, by mesne assignments, to Universal Oil Products Company, Chicago, Ill., a corporation of Delaware No Drawing. Application September 12, 1957
Serial No. 683,466

5 Claims. (Cl. 260—340.5)

This invention relates to new compositions of matter which may be used as insecticides and to a method for the preparation thereof. More specifically the invention relates to a method for the preparation of halocycloalkenic derivatives of methylenedioxybenzenes.

It is an object of this invention to prepare insecticidal compounds by condensing a derivative of methylenedioxybenzene with a halogenated unsaturated compound.

One embodiment of this invention resides in a process for preparing halocycloalkenic derivatives of methylenedioxybenzenes by condensing an unsaturated side chain derivative of a methylenedioxybenzene with an unsaturated compound selected from the group consisting of (1) haloalkadienes having the formula

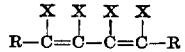

in which each of the X radicals is independently selected from the group consisting of hydrogen, alkyl, halogen radicals having an atomic weight of from 35 to 127, and haloalkyl radicals, at least one X being halogen, and each of the R radicals is independently selected from the group consisting of hydrogen and alkyl radicals, and (2) halocycloalkadienes, and recovering the resultant halocycloalkenic derivative of a methylenedioxybenzene.

A specific embodiment of the invention is found in a process for the preparation of a halocycloalkenic derivative of a methylenedioxybenzene which comprises condensing an unsaturated side chain derivative of a methylenedioxybenzene with hexachlorocyclopentadiene at a temperature in the range of from about 20° to about 250° C. and at a pressure in the range of from about 1 to about 100 atmospheres, and recovering the resultant halocycloalkenic derivative of a methylenedioxybenzene.

A more specific embodiment of the invention resides in a process for the preparation of a halocycloalkenic derivative of methylenedioxybenzene which comprises condensing 4-allyl-1,2-methylenedioxybenzene with hexachlorocyclopentadiene at a temperature in the range of from about 20° to about 250° C. and at a pressure in the range of from about 1 to about 100 atmospheres, and recovering the resultant 1,2,3,4,7,7-hexachloro-5-(3,4-methylenedioxybenzyl)-2-norbornene.

Another embodiment of the invention is found in a halocycloalkenic derivative of a methylenedioxybenzene.

Other objects and embodiments referring to alternative halogenated unsaturated compounds and to alternative unsaturated side chain derivatives of a methylenedioxybenzene will be found in the following further detailed description of the invention.

It has now been discovered that halocycloalkenic derivatives of methylenedioxybenzenes which are prepared by condensing a halogenated conjugated diolefin with an unsaturated side chain derivative of methylenedioxybenzene find a wide variety of uses in the chemical field. For purposes of this invention the term "halocycloalkenic" will refer to halocycloalkenic, polyhalocycloalkenic, halobicycloalkenic and polyhalobicycloalkenic derivatives of methylenedioxybenzene. In addition, the term "halo" will refer to both mono- and polyhalo substituted diolefins. One use to which the condensation products of the present invention may be put is as pesticides or insecticides, especially against houseflies. In addition, the reaction products of this invention may also be used as oxidation inhibitors or as intermediates in the preparation of resins, pharmaceuticals, plastics, etc.

The process of this invention in which the halo-substituted conjugated diolefin, either straight chain or cyclic, is condensed with the unsaturated side chain derivative of a methylenedioxybenzene will take place at temperatures in the range of from about 20° to about 250° C. and often preferably at a temperature in the range of from about 80° to about 180° C., the reaction temperature being dependent upon the particular reactants which are to be condensed. Generally speaking, the reaction will take place at atmospheric pressure; however, if higher temperatures are to be used when condensing a lower boiling halogenated diene with the unsaturated side chain derivative of the methylenedioxybenzene, superatmospheric pressures ranging from about 2 to about 100 atmospheres or more will be used, the amount of pressure used being necessary to maintain at least a portion of the reactants in the liquid phase. In addition, if so desired, the reaction may take place in the presence of inert organic solvents including aromatic solvents such as benzene, toluene, o-, m- and p-xylene, ethyl benzene, etc.; alcohols such as methyl alcohol, ethyl alcohol, propyl alcohol, etc.; ethers such as dimethyl ether, diethyl ether, dipropyl ether, etc.; saturated low molecular weight aliphatic hydrocarbons such as pentane, hexane, heptane, etc.; or acetone, acetic acid, etc.

Unsaturated compounds containing a halogen substituent which may be reacted with the unsaturated side chain derivative of an epoxycyclohexane in the process of the present invention include straight-chain diolefins having the general formula:

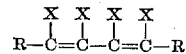

in which each of the X radicals is independently selected from the group consisting of hydrogen, alkyl, halogen having an atomic weight of from 35 to 127 (i.e. chlorine, bromine or iodine), and haloalkyl radicals, at least one X being halogen, and each of the R radicals is independently selected from the group consisting of hydrogen and alkyl radicals, or polyhalocycloalkadienes having the general formula:

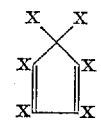

in which X has the same meaning as above. Examples of these compounds include haloalkadienes such as 1-chloro-1,3-butadiene, 1,3-dichloro-1,3-butadiene, 1-bromo-1,3-butadiene, 1,3-dibromo-1,3-butadiene, 1,3-diiodo-1,3-butadiene, 2,3-dichloro-1,3-butadiene, 2,3-dibromo-1,3-butadiene, 2,3-diiodo-1,3-butadiene, 1,2,3-trichloro-1,3-butadiene, 1,2,3-tribromo-1,3-butadiene, 1-iodo-1,3-butadiene, 1,2-diiodo-1,3-butadiene, 1,2,3-triiodo-1,3-butadiene, 1,2,3,4-tetrachloro-1,3-butadiene, 1,2,3,4-tetrabromo-1,3-butadiene, 1,2,3,4-tetraiodo-1,3-butadiene, 1,3-dichloro-2-methyl-1,3-butadiene, 1,4-dichloro-2-methyl-1,3-butadiene, 1,4-dichloro-2-chloromethyl-1,3-butadiene, 1,4- dichloro-2-dichloromethyl-1,3-butadiene, 1,3-dibromo-2-methyl-1,3-butadiene, 1,4-dibromo-2-methyl-1,3-butadiene, 1,4-dibromo-2-bromomethyl-1,3-butadiene, 1,4-dibromo-2-dibromomethyl-1,3-butadiene, 1,3-diiodo-2-methyl-1,3-butadiene, 1,4-diiodo-2-methyl-1,3-butadiene, 1,4-diiodo-2-iodomethyl-1,3-butadiene, 1,4-diiodo-2-diiodomethyl-1,3-butadiene, etc.; and halocycloalkadienes such as halogenated 1,3-cyclopentadienes which for purposes of this invention will be designated as halogenated cyclopentadienes including 1-, 2-, or 5-chlorocyclopentadiene, 1,5-, 5,5-, 2,3-, 1,4-, 1,2-, or 1,3-dichlorocyclopentadiene, 1,5,5-, 1,2,5-, 1,3,5-, 1,2,4-, 2,5,5-, 1,4,5-, or 1,2,3-trichlorocyclopentadiene, 2,3,5,5-, 1,2,3,5-, 1,2,4,5-, 1,2,3,4-, 1,3,5,5-, 1,2,5,5-, or 1,4,5,5-tetrachlorocyclopentadiene, 1,2,3,5,5-, 1,2,4,5,5-, or 1,2,3,4,5-pentachlorocyclopentadiene, hexachlorocyclopentadiene, the corresponding monobromocyclopentadienes, polybromocyclopentadienes, mono iodocyclopentadienes, polyiodocyclopentadienes, etc. It is also contemplated within the scope of this invention that polyhalo substituted conjugated cyclohexadienes such as 1,2-dichloro-1,3-cyclohexadiene, 1,2,3-trichloro-1,3-cyclohexadiene, octachloro-1,3-cyclohexadiene, etc., 1,2-dibromo, 1,3-cyclohexadiene, 1,2,3-tribromo-1,3-cyclohexadiene, octabromo-1,3-cyclohexadiene, 1,2-diiodo-1,3-cyclohexadiene, 1,2,3-triiodo-1,3-cyclohexadiene, octaiodo-1,3-cyclohexadiene, etc., may also be used. In addition, it is also contemplated that polyhaloalkadienes and polyhalocycloalkadienes which are used in this process may contain more than one species of halo substituents, such as, for example, 1,2-dichloro-3-bromo-1,3-butadiene, 1-chloro-3-bromo-1,3-butadiene, 1-iodo-3-chloro-1,3-butadiene, 2-bromo-3-chloro-1,3-butadiene, 1,3-dichloro-2-bromomethyl-1,3-butadiene, 1,3-dichloro-2-iodomethyl-1,3-butadiene, 1-chloro-2-bromocyclopentadiene, 1,2-dichloro-3-bromocyclopentadiene, 1,2-dichloro-5,5-dibromocyclopentadiene, etc., may also be used although not necessarily with equivalent results.

Methylenedioxybenzenes containing an unsaturated side chain substituent which may be used in the process of this invention are those having the generic formula:

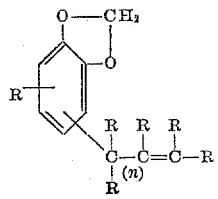

in which each R radical is independently selected from the group consisting of hydrogen, alkyl and aryl radicals, and $n$ is an integer from 0 to about 8, as for example 3-vinyl-1,2-methylenedioxybenzene, 4-vinyl-1,2-methylenedioxybenzene, 3-allyl-1,2-methylenedioxybenzene, 4-allyl-1,2-methylene-dioxybenzene, 3-methallyl-1,2-methylenedioxybenzene, 4-methallyl-1,2-methylenedioxybenzene, 3-crotonyl-1,2-methylenedioxybenzene, 4-crotonyl-1,2-methylenedioxybenzene, isomeric 3- or 4-pentenyl, hexenyl, heptenyl, octenyl, nonenyl, etc. -1,2-methylenedioxybenzenes, etc., 3-methyl-4-vinyl-1,2-methylenedioxybenzene, 3-methyl-4-allyl-1,2-methylenedioxybenzene, 3-ethyl-4-vinyl-1,2-methylenedioxybenzene, 3-ethyl-4-allyl-1,2-methylenedioxybenzene, 5-methyl-3-vinyl-1,2-methylenedioxybenzene, 5-methyl-3-allyl-1,2-methylenedioxybenzene, etc. It is to be understood that the aforementioned haloalkadienes, halocycloalkadienes and unsaturated side chain derivatives of 1,2-methylenedioxybenzene are only representatives of the class of compounds which may be used, and that this invention is not necessarily limited thereto.

An example of the condensation reaction of the present process may be illustrated by the following equations in which 4-allyl-1,2-methylenedioxybenzene (safrole) is reacted with 2,3-dichloro-1,3-butadiene and hexachlorocyclopentadiene respectively:

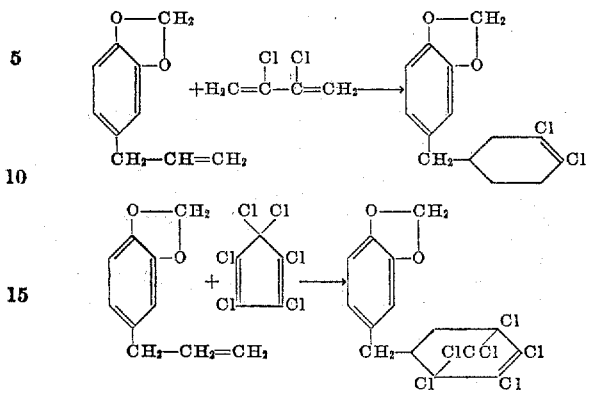

The physical properties of the present halobicycloalkenic derivatives of methylenedioxybenzenes and the effects they have on entomological forms of life make them particularly desirable as insecticides, the compounds having many of the features desired of materials of this purpose. They are, for example, toxic to insects which are destructive to plant life and materials normally subject to insect infestation, their toxic effects being manifested by contact of the poison with the insect. The insecticides comprising the present compound are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent to the mixture of components. The latter solvents and dispersants may also be employed for the specific purpose of reducing the concentration of insecticide to the desired level in a specific insecticide formulation, the particular formulation of active components in combination with the solvent or dispersant being dependent upon its application. Compositions containing as high as 20% of active component may be preferred in some instances where deep penetration of the insecticide is desired, as in the treatment of fibrous material, such as wood, for extinction of a particular infestation, for example, wood termites. For other purposes, the required concentration of active components in the formulation may be as low as 0.1%, as for example in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

The process of the present invention may be effected in any suitable manner and may comprise either a batch or a continuous type operation. For example, when a batch type operation is used, a quantity of the starting materials comprising the unsaturated side chain derivatives of a methylenedioxybenzene and, if so desired, an inert organic solvent is placed in a condensation apparatus provided with heating and mixing means. The flask is adjusted to the desired temperature and the haloalkadiene or halocycloalkadiene is added thereto at a predetermined rate, the temperature of the flask being maintained at the desired level for a predetermined residence time. At the end of this time the flask and contents thereof are allowed to cool to room temperature and the desired reaction product is separated from unreacted starting materials by conventional means such as fractional distillation, crystallization, etc. Alternatively, the reactants and solvent, if any, may be first admixed and then heated to the desired reaction temperature.

Another method of effecting the condensation reaction of the present invention is by a continuous type operation. In this type of operation the starting materials comprising the unsaturated side chain derivative of a methylenedioxybenzene and the halocycloalkadiene or haloalkadiene are continuously charged to a reactor which is maintained at the proper operating conditions of temperature and pressure. The reactor may comprise an unpacked vessel or coil or may be lined with an adsorbent packing material such as fire brick, alumina, dehydrated bauxite or the like. If so desired, inert organic solvent of the type hereinbefore set forth may be added through a separate line or admixed with one or the other of the starting materials prior to entry into said reactor and charged thereto in a single line. The reaction product is continuously withdrawn from the reactor, separated from the reactor effluent and purified by conventional means hereinbefore set forth, while the unreacted starting materials are separated and recharged to the reactor as a portion of the feed stock.

Examples of reaction products which are prepared according to the present process include 1,2-dichloro-5-(3,4 - methylenedioxybenzyl) - 2 - norbornene, 1,3 - dichloro - 5 - (3,4 - methylenedioxybenzyl) - 2 - norbornene, 1,4 - dichloro - 5 - (3,4 - methylenedioxybenzyl)-2 - norbornene, 1,2,3 - trichloro - 5 - (3,4 - methylenedioxybenzyl) - 2 - norbornene, 1,2,3,4 - tetrachloro - 5 - (3,4 - methylenedioxybenzyl) - 2 - norbornene, 1,2,3,4,7,7 - hexachloro - 5 - (3,4 - methylenedioxybenzyl) - 2-norbornene, 1,2 - dibromo - 5 - (3,4 - methylenedioxybenzyl) - 2 - norbornene, 1,3 - dibromo - 5 - (3,4-methylenedioxybenzyl) - 2- norbornene, 1,4 - dibromo-5 - (3,4 - methylenedioxybenzyl) - 2 - norbornene, 1,2,3-tribromo - 5 - (3,4 - methylenedioxybenzyl) 2 - norbornene, 1,2,3,4 - tetrabromo - 5 - (3,4 - methylenedioxybenzyl) - 2 - norbornene, 1,2,3,4,7,7 - hexabromo - 5- (3,4 - methylenedioxybenzyl) - 2 -norbornene, 1,2 - diiodo - 5 - (3,4 - methylenedioxybenzyl) - 2 - norbornene, 1,3 - diiodo - 5 - (3,4 - methylenedioxybenzyl) - 2 - norbornene, 1,4 - diiodo - 5 - (3,4 - methylenedioxybenzyl)-2 - norbornene, 1,2,3 - triiodo - 5 - (3,4 - methylenedioxybenzyl) - 2 - norbornene, 1,2,3,4 - tetraiodo - 5 - (3,4-methylenedioxybenzyl) - 2 - norbornene, 1,2,3,4,7,7-hexaiodo - 5 - (3,4 - methylenedioxybenzyl) - 2 - norbornene, 1,2 - dichloro - 4 - (3,4 - methylenedioxybenzyl)-1 - cyclohexene, 3,6 - dichloro - 4 - (3,4 - methylenedioxybenzyl) - 1 - cyclohexene, 2,3 - dichloro - 4 - (3,4-methylenedioxybenzyl) - 1 - cyclohexene, 1,2,3 - trichloro - 4 - (3,4 - methylenedioxybenzyl) - 1 - cyclohexene, 1,2,3,6 - tetrachloro - 4 - (3,4 - methylenedioxybenzyl) - 1 - cyclohexene, 1,2 -dibromo - 4 - (3,4-methylenedioxybenzyl) - 1 -cyclohexene, 3,6 -dibromo-4 - (3,4 - methylenedioxybenzyl) - 1 - cyclohexene, 2,3-dibromo - 4 - (3,4 -methylenedioxybenzyl) - 1 - cyclohexene, 1,2,3 - tribromo - 4 - (3,4 - methylenedioxybenzyl) - 1 - cyclohexene, 1,2,3,6 - tetrabromo - 4 - (3,4-methylenedioxybenzyl) - 1 - cyclohexene, 1,2 - diiodo-4 - 3,4 - methylenedioxybenzyl) - 1 - cyclohexene, 3,6-diiodo - 4 - (3,4 - methylenedioxybenzyl) - 1 - cyclohexene, 2,3 - diiodo - 4 - (3,4 -methylenedioxybenzyl)-1 - cyclohexene, 1,2,3 - triiodo - 4 - (3,4 - methylenedioxybenzyl) - 1 - cyclohexene, 1,2,3,6 - tetraiodo - 4-(3,4 -methylenedioxybenzyl) - 1 - cyclohexene, 1,2-dichloro - 5 - (3,4 -methylenedioxyphenyl) - 2 -norbornene, 1,4 - dichloro - 5 - (3,4 - methylenedioxyphenyl)-2 - norbornene, 1,2,3,4 - tetrachloro - 5 - (3,4 - methylenedioxyphenyl) - 2 -norbornene, 1,2 - dibromo - 5-(3,4 - methylenedioxyphenyl) - 2 -norbornene, 1,4 - dibromo - 5 - (3,4 - methylenedioxyphenyl) - 2 - norbornene, 1,2,3,4 - tetrabromo - 5 - (3,4 - methylenedioxyphenyl)-2-norbornene, 1,2-diiodo-5-(3,4-methylenedioxyphenyl)-2-norbornene, 1,4 - diiodo-5-(3,4 - methylene-dioxyphenyl) - 2 - norbornene, 1,2,3,4 - tetraiodo - 5 - (3,4-methylenedioxyphenyl) - 2 - norbornene, 1,2 -dichloro-4 - (3,4 -methylenedioxyphenyl) - 1 - cyclohexene, 2,3-dichloro - 4 - (3,4 - methylenedioxyphenyl) - 1 - cyclohexene, 1,2,3,6 -tetrachloro - 4 - (3,4 -methylenedioxyphenyl) - 1 - cyclohexene, 1,2 - dibromo - 4 - (3,4-methylenedioxyphenyl) - 1 - cyclohexene, 2,3 - dibromo-4 - (3,4 -methylenedioxyphenyl) - 1 - cyclohexene, 1,2, 3,6 - tetrabromo - 4 - (3,4 - methylenedioxyphenyl) - 1-cyclohexene, 1,2 - diiodo - 4 - (3,4 - methylenedioxyphenyl) - 1 - cyclohexene, 2,3 - diiodo - 4 - (3,4 - methylenedioxyphenyl) - 1 - cyclohexene, 1,2,3,6 - tetraiodo-4 - (3,4 -methylenedioxyphenyl) - 1 - cyclohexene, etc. It is to be understood that the aforementioned reaction products are only representatives of the products obtained by the condensation of the unsaturated side chain derivative of the methylenedioxybenzene and the halodiolefinic compound.

The following examples are given to illustrate the process of the present invention, which, however, are not intended to limit the generally broad scope of the present invention in strict accordance therewith.

*Example I*

A mixture of 27 g. (0.1 mole) of hexachlorocyclopentadiene and 16 g. (0.1 mole) of safrole (4-allyl-1,3-methylenedioxybenzene) dissolved in 50 g. of toluene is refluxed at an initial temperature of about 120–125° C. for a period of about 6 hours during which time the inert solvent, toluene, is distilled over until the reaction temperature reaches approximately 200° C. The reaction mixture is maintained at this temperature for an additional 2 hours, after which time the vessel and contents thereof are cooled to room temperature and the reaction product is recovered, washed, dried and distilled under reduced pressure. The desired product, comprising 1,2,3,4,7,7 - hexachloro - 5 - (3,4 - methylenedioxybenzyl)-2-norbornene is separated therefrom.

*Example II*

A solution of 27 g. (0.1 mole) of hexachlorocyclopentadiene and 15 g. (0.1 mole) of 4-vinyl-1,2-methylenedioxybenzene in 50 g. of xylene is heated under reflux for a period of about 5 hours during which time the xylene is distilled over until the reaction temperature reaches a maximum of about 225° C. At the end of this time the flask and contents thereof are allowed to cool to room temperature and the reaction product is recovered, washed, dried and subjected to fractional distillation under reduced pressure. The desired product, comprising 1,2,3,4,7,7 - hexachloro - 5 - (3,4 - methylenedioxyphenyl)-2-norbornene, is separated therefrom.

*Example III*

A solution of 16 g. of safrole and 12 g. of 2,3-dichloro- 1,3-butadiene in 50 g. of toluene is heated under reflux for about 5 hours, after which the product is recovered and treated as described for the products of Examples I and II above. The desired product, comprising 1,2-dichloro - 4 - (3,4 - methylenedioxybenzyl) - 1 - cyclohexene is recovered therefrom.

Example IV

A solution of 15 g. of 4-vinyl-1,2-methylenedioxybenzene and 12 g. of 2,3-dichloro-1,3-butadiene in 50 g. of xylene is treated as described in Examples I to III above. The desired product, comprising 1,2-dichloro-4-(3,4-methylenedioxyphenyl)-1-cyclohexene is recovered by fractional distillation under reduced pressure.

Example V

A solution of 15 g. of 4-allyl-1,2-methylenedioxybenzene and 12 g. of 1,4-dichloro-2-methyl-1,3-butadiene in 50 g. of xylene is treated in a manner similar to the procedure described in the above examples. The desired product, comprising a mixture of 3,6-dichloro-1-methyl-5 - (3,4 -methylenedioxybenzyl) - 1 - cyclohexene and 3,6 - dichloro - 1 - methyl - 4 - (3,4 - methylenedioxybenzyl)-1-cyclohexene, is recovered by fractional distillation under reduced pressure.

Example VI

An insecticidal solution is prepared by dissolving 1 g. of 1,2,3,4,7,7 - hexachloro - 5 - (3,4 - methylenedioxybenzyl) - 2 - norbornene in 2 cc. of benzene and adding 100 cc. of water using Triton X–100 as an emulsifying agent. This solution is sprayed into a cage containing common house flies and causes a 100% knock-down.

Similar tests with the other insecticides of Examples II to V show that these compounds, like the compound of Example I, show a markedly superior knock-down ability with essentially equal killing power as compared to insecticides containing only halogen substituents.

We claim as our invention:

1. A compound selected from the group consisting of polyhalo - 5 - (3,4 - methylenedioxybenzyl) - 2 - norbornenes, polyhalo - 4 - (3,4 - methylenedioxybenzyl) - 1-cyclohexenes, polyhalo - 5 - (3,4 - methylenedioxyphenyl) - 2 - norbornenes and polyhalo - 4 - (3,4-methylenedioxyphenyl) - 1 - cyclohexenes, said compound being a halocycloalkenic compound in which the halogens are attached to the cycloalkenic ring.

2. 1,2,3,4,7,7 -hexachloro - 5 - (3,4 - methylenedioxybenzyl)-2-norbornene.

3. 1,2,3,4,7,7, - hexachloro - 5 - (3,4 - methylenedioxyphenyl) - 2 - norbornene.

4. 1,2 - dichloro - 4 - (3,4 -methylenedioxybenzyl) - 1-cyclohexene.

5. 1,2 - dichloro - 4 - (3,4 - methylenedioxyphenyl)-1-cyclohexene.

References Cited in the file of this patent

E. A. Prill et al.: Contributions from Boyce-Thompson Institute, vol. 14, pp. 221–227 (1945).

E. K. Fields: J. Am. Chem. Soc., vol. 76, pp. 2709–2710, May 20, 1954.